(No Model.) 2 Sheets—Sheet 1.

J. F. KELLY.
METHOD OF PRODUCING CONTINUOUS MOTION BY ALTERNATING CURRENTS.

No. 522,345. Patented July 3, 1894.

WITNESSES:
Frank S. Ober
C. R. Lohse

INVENTOR
John F. Kelly
BY H. B. Brownell
ATTORNEY (No Model.) 2 Sheets—Sheet 2.

J. F. KELLY.
METHOD OF PRODUCING CONTINUOUS MOTION BY ALTERNATING CURRENTS.

No. 522,345. Patented July 3, 1894.

WITNESSES:
Frank S. Ober
C. R. Lohse

INVENTOR
John F. Kelly
BY
H. B. Brownell.
ATTORNEY

THE NORRIS PETERS CO., PHOTO-LITHO., WASHINGTON, D. C.

UNITED STATES PATENT OFFICE.

JOHN F. KELLY, OF PITTSFIELD, MASSACHUSETTS, ASSIGNOR TO THE STANLEY LABORATORY COMPANY, OF SAME PLACE.

METHOD OF PRODUCING CONTINUOUS MOTION BY ALTERNATING CURRENTS.

SPECIFICATION forming part of Letters Patent No. 522,345, dated July 3, 1894.

Application filed February 26, 1894. Serial No. 501,466. (No model.)

*To all whom it may concern:*

Be it known that I, JOHN F. KELLY, of the city of Pittsfield, county of Berkshire, and State of Massachusetts, have invented a certain new and useful Method of Producing Continuous Motion by an Alternating Current, of which the following is a specification, reference being had to the accompanying drawings, showing various means known to me by which my new method can be carried out.

By my method I am able to transform the electrical energy of a single alternating current into mechanical energy in the form of continuous rotary motion without the use of commutators or other similar devices, and without the use of any modifier of the magnetic or electrical phases of the magnetic field or the exciting current, or of any auxiliary circuit or starting device. This I believe has never been accomplished by any other known method.

The method consists essentially in producing by an exciting system an asymmetrical alternating field, and inducing in a symmetrical system within that field currents having opposite limbs lying in different strengths of field, one or both of said systems being free to move.

My method can be carried out by a variety of means of some of which I am the inventor, and for which I am about to apply for United States Letters Patent. Some of these various means may be described as follows,—reference being made to the accompanying drawings, in which—

Figure 1:
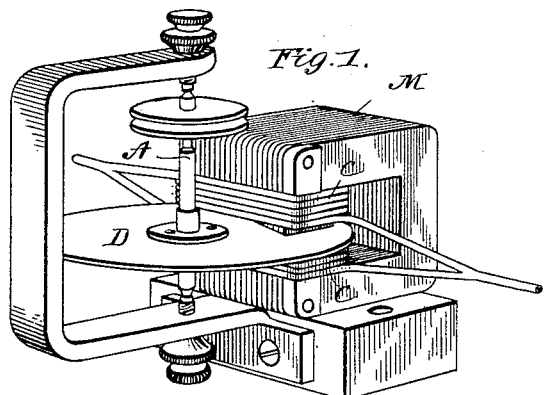
Figure 2:
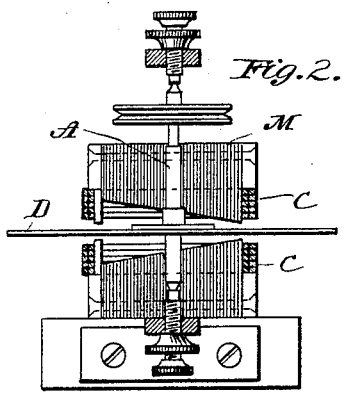
Figure 3:
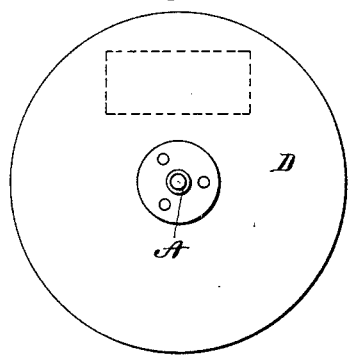
Figure 4:
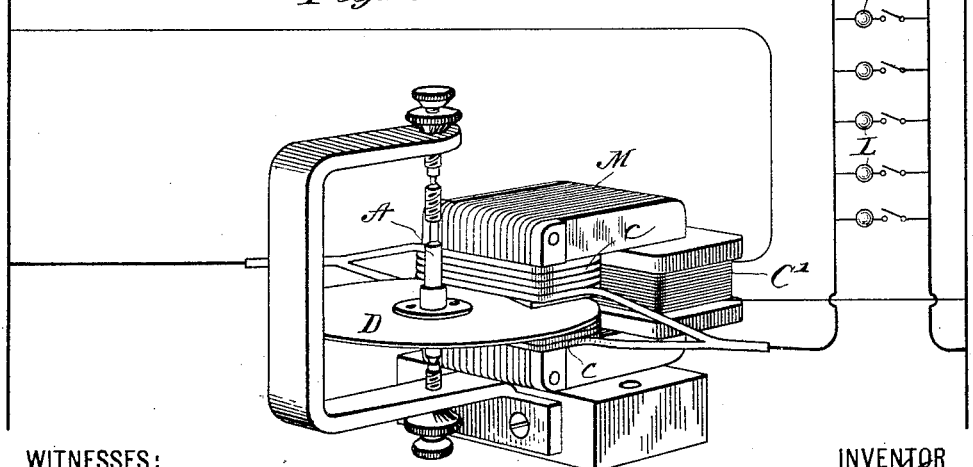
Figure 5:
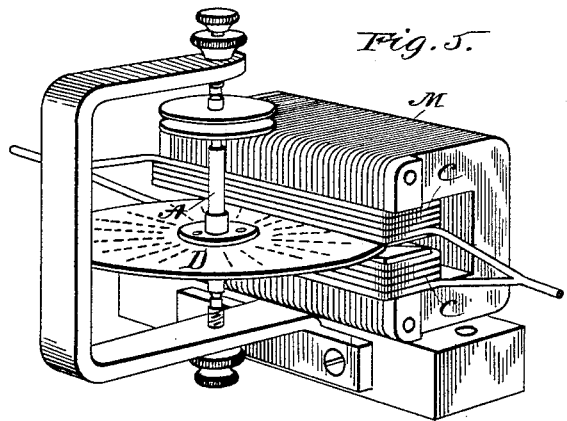
Figure 6:
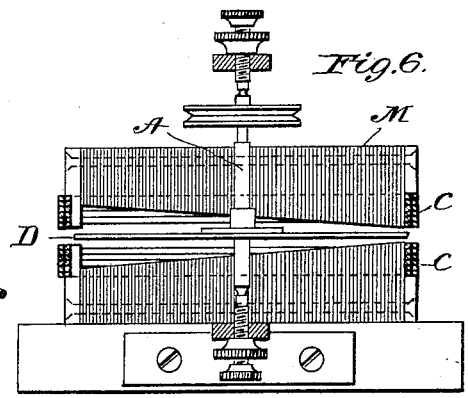
Figure 7:
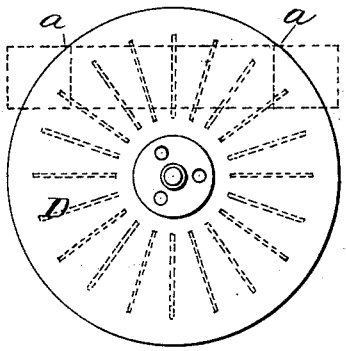

Figure 1 is a perspective view of a motor; Fig. 2 a front elevation with the coils of the field magnet cut away so as to show its poles; Fig. 3 a view showing a projection of the pole upon the disk; Fig. 4 a view showing an adaptation of the motor for a meter and like purposes. Figs. 5, 6 and 7 show a modification of the motor shown in Figs. 1, 2 and 3, and Figs. 8 and 9 show other forms of field magnets.

In the drawings, M represents a laminated field magnet, the pole pieces of which are brought face to face so as to leave a wedge shaped air space between them; C an exciting coil connected with a source of alternating current; D a disk of homogeneous copper or other good electrical conductor supported by a suitably mounted axis A, so as to lie between the pole pieces and be free to rotate in a direction from one end of the wedge shaped air space toward the other.

Upon the passage of an alternating current through the exciting coil C, the field magnet becomes energized and an alternating magnetic field of single or uniform phase produced, the magnetic flux being from one pole piece to the other. By reason of the variation in the reluctance of the magnetic circuit resulting from the wedge shaped air space the magnetic flux is greater toward the narrower part of the air space, that is, the alternating magnetic field is more strong or dense in that part, or, as we may say, the magnet, so constructed, produces when energized an asymmetrical alternating magnetic field which is to be understood to mean an alternating magnetic field in which the distribution of flux is not the same on both sides of the center of its figure. The action of the asymmetrical field upon the disk lying within it is to induce currents therein which, reacting upon the inducing field, produce motion.

When the induced conductor extends well beyond the strong side of the pole, as shown in Figs. 1, 2 and 3, the relative motion of the induced system is from the weak to the strong side of the pole, and is due to the fact that one limb of the currents induced in the disk lies well without the strong side of the pole while the other limb lies for the most part beneath the pole, that is, the two limbs of the currents are not in parts of the field which are of equal strength. If now the induced system is symmetrical about an axis on which it is mounted so as to be free to rotate, as shown, the result is that the symmetrical induced system always presents a surface of unchanging form to the inducing field so that the induced currents at the various stages of the alternations always bear the same relation to that field, resulting in a continuous movement.

It is of course well known that the inducing field-magnet can be mounted, collecting rings and brushes being used, so that it may rotate while the disk or armature is held fast, or so that both may rotate in opposite directions.

So far as the method is concerned, it makes no difference what the form of the inducing system or the induced system is, provided only the inducing system produces an asymmetrical field of single or uniform phase while the induced system is symmetrical so as to present an unchanging conductor for the induction of currents, and the two systems are relatively movable. The method is the same whether one or more field magnets are used.

The method may also be carried out by a motor in which there is one circuit having a coil C, in series with one or more translating devices L, and another having a coil C' in multiple with such translating devices, as shown in Fig. 4. Such an arrangement of circuits is useful where the motor is used in a current measuring instrument, in which case the multiple arc or shunt circuit C' is made of such high resistance as to permit the passage of only a very small current, enough nearly, but not quite, to maintain motion, in spite of the friction of the moving member. Under such circumstances, if the circuit is completed through a translating device in the series circuit, the motor starts and the indicating devices show the quantity of current used.

In Figs. 5, 6 and 7 is shown a construction in which the pole pieces are extended so as to extend beyond the induced disk. In such a case, the currents induced in the disk cannot form outside of the inducing field as they would otherwise do. The result is that both limbs of the induced currents lie beneath the poles of the field magnet and the action is such as to produce a relative rotation in the direction from the narrow and toward the wide part of the air space. This action is even more pronounced if the disk is slotted radially at frequent intervals, as shown in dotted lines. The disk even when slotted is substantially symmetrical in all respects as to its axis, so that there is a continuous unchanging conductor within the inducing field. When the disk is slotted, the pole pieces may be narrower, so as not to extend up to the edge of the disk. This motion from the strong and toward the weak side of the field is due to the fact that both limbs of the currents are substantially within the field, but are not in parts of equal strength, and the limb lying in the strongest part prevails.

Figure 8:
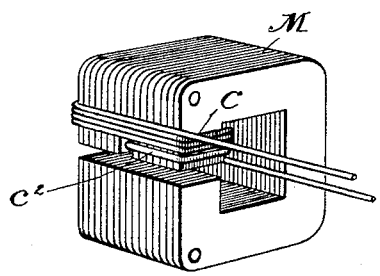
Figure 9:
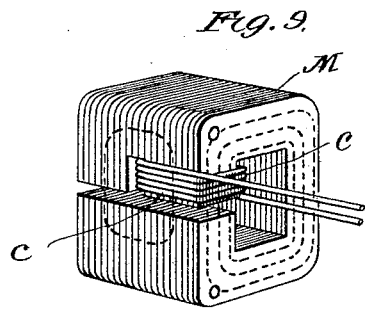

The asymmetrical field as above described is the result of a variation in the reluctance of the magnetic circuit. Such a field may, however, be produced by the windings of the field magnet. In Fig. 8 I have shown a magnet in which the distance between the poles is substantially uniform, and in which one side, in addition to the main energizing coil C of the magnet is reinforced by an additional winding $C^2$, so that the two sides of the magnet are of like sign but unequal strength. The rotation in such case is, under the various conditions specified, the same as above described. The asymmetrical field may also be produced by a coil which embraces but part of the field magnet as shown in Fig. 9, resulting in a difference of polarity between the two parts of the polar face. In such case, the principal magnetic circuit is around through the whole core crossing the air space but once, while some of the flux passes to the other branch of the core crossing the air space twice. The magnetic flux from the unwound part of the pole is of different sign and very considerably less than that from the part of the pole embraced by the energizing coil. In this case, the rotation of a solid disk extending well beyond the pole pieces is in the direction of the weaker pole, for the reason that the currents induced by the stronger part of the pole are of the same direction as previously while the field through which they pass is reversed as to its polarity.

It is thus seen that the method consists broadly in setting up a single phase alternating asymmetrical magnetic field, and by such field inducing a current in a closed conducting system free to move, and more particularly in setting up a single phase alternating asymmetrical magnetic field, and by such field inducing a current in a symmetrically mounted conducting system mounted so as to be free to move from the weaker to the stronger part of the field and vice versa.

I do not claim herein the various means described by which the method above set forth can be carried out as the same are separate inventions, for some of which I am about to apply for separate Letters Patent.

What I claim as my invention is—

1. The method of converting electrical energy into mechanical energy which consists in producing by an alternating current inducing system, a single phase alternating asymmetrical magnetic field, and by such field inducing a current in a closed conducting system, the inducing system and the conductor being relatively movable, substantially as described.

2. The method of converting electrical energy into mechanical energy which consists in producing by an alternating current inducing system a single phase alternating asymmetrical magnetic field and by such field inducing a current in a conducting system symmetrical to an axis about which the conducting system or the inducing system is free to rotate, substantially as described.

3. The method of converting electrical energy into mechanical motion which consists in producing by an alternating current inducing system a single phase alternating asymmetrical magnetic field and by such field inducing, in a closed conducting system mounted symmetrically to an axis of rotation, currents whose opposite limbs lie in different strengths of field, the inducing system and the conductor being relatively movable, substantially as described.

JOHN F. KELLY.

Witnesses:
JNO. H. NOBLE,
C. C. CHESNEY.